E. E. PIERCE.
TANK SIGNAL.
APPLICATION FILED JULY 6, 1918.
1,366,832.
Patented Jan. 25, 1921.
2 SHEETS—SHEET 1.
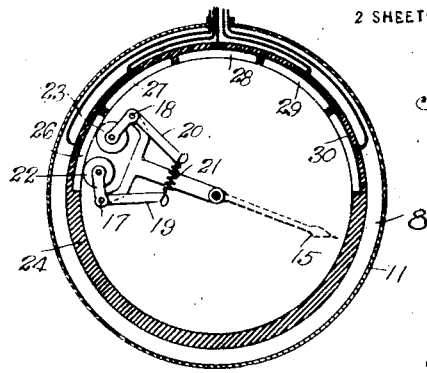
Fig. 2.
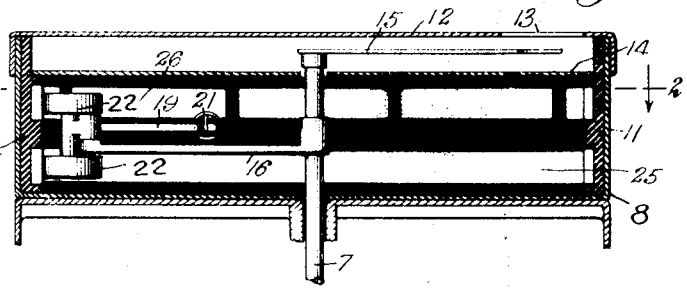
Fig. 3.
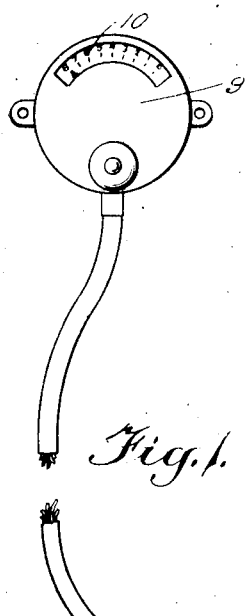
Fig. 1.
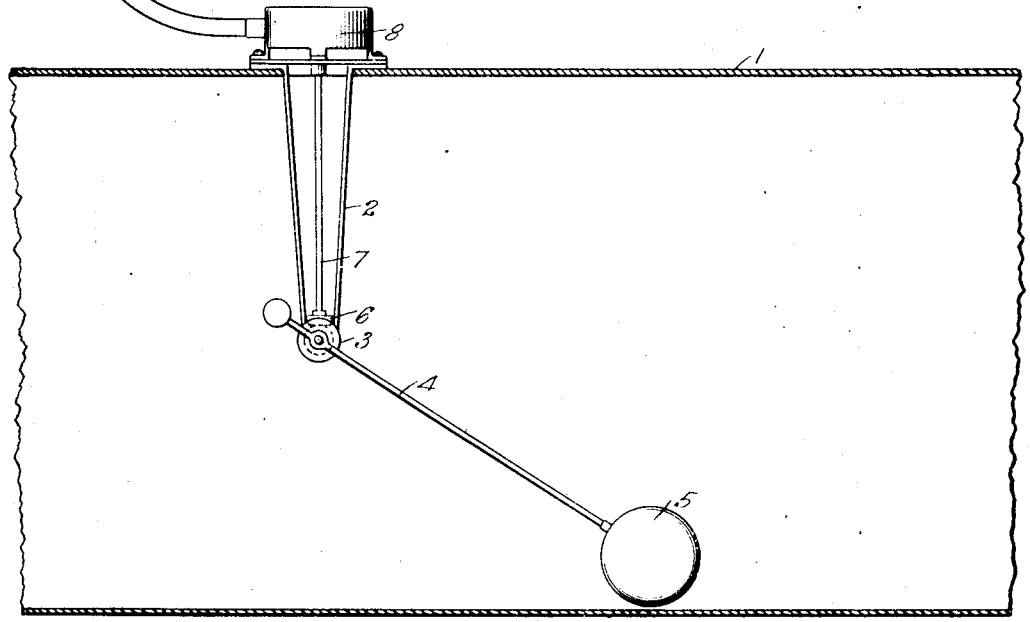
WITNESSES
INVENTOR
Ernest E. Pierce
BY
ATTORNEYS E. E. PIERCE.
TANK SIGNAL.
APPLICATION FILED JULY 6, 1918.
1,366,832.
Patented Jan. 25, 1921.
2 SHEETS—SHEET 2.
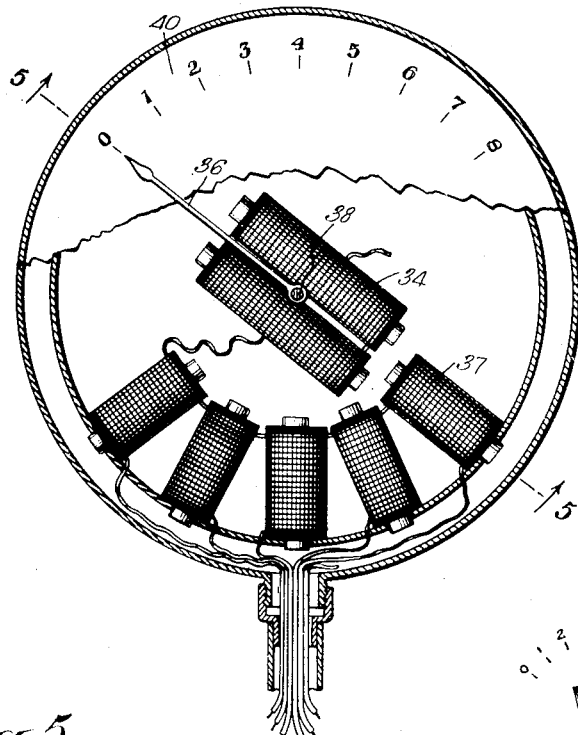
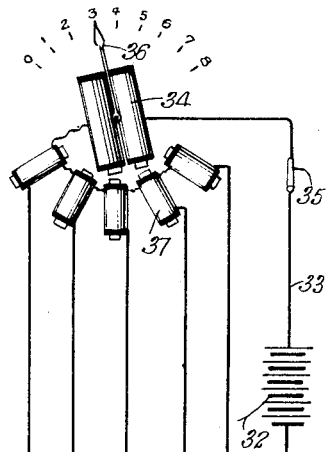
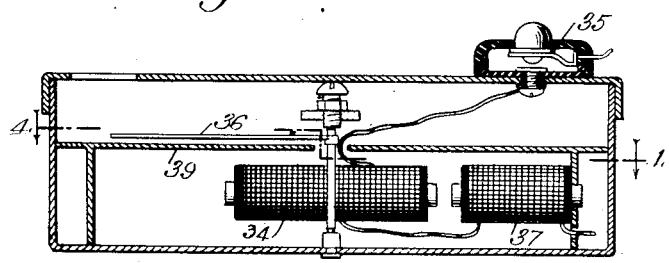
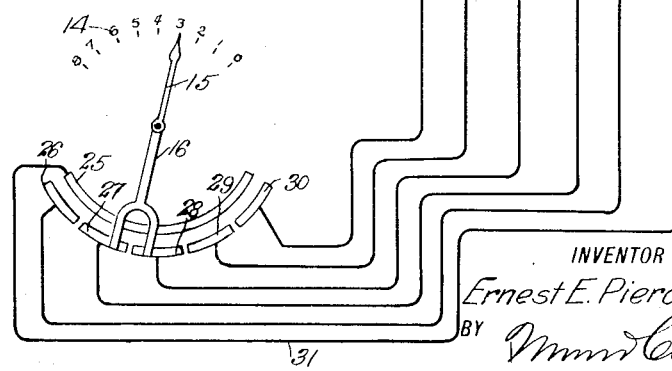
WITNESSES
INVENTOR
Ernest E. Pierce
BY
ATTORNEYS

UNITED STATES PATENT OFFICE.

ERNEST E. PIERCE, OF TARRYTOWN, NEW YORK.

TANK-SIGNAL.

1,366,832.  Specification of Letters Patent.  Patented Jan. 25, 1921.

Application filed July 6, 1918. Serial No. 243,713.

*To all whom it may concern:*

Be it known that I, ERNEST E. PIERCE, a citizen of the United States, and a resident of Tarrytown, in the county of Westchester and State of New York, have invented new and Improved Tank-Signals, of which the following is a full, clear, and exact description.

This invention relates to signal devices for gasolene and other tanks and has for an object the provision of an improved construction which may have an indicating member on the front dash of an automobile or at any other convenient point and electrically operated whenever the manually operated switch is closed for indicating the level of fuel in the supply tank.

Another object in view is to provide an indicator electrically operated which will utilize electric current only when giving the signal.

A further object of the invention is the provision of a signaling device for indicating the level of gasolene in a tank which includes an indicating mechanism having a plurality of magnets arranged in such a manner that a swinging magnet may be held opposite any particular magnet or opposite a point between any particular magnet so as to give an increased number of stops of the indicating finger over the number of magnets used.

In the accompanying drawings:

Figure 1 is a fragmentary longitudinal sectional view through a tank with an embodiment of the invention applied thereto.

Fig. 2 is a sectional view through Fig. 3 on line 2—2.

Fig. 3 is a sectional view through the automatic switch mechanism shown in Fig. 2.

Fig. 4 is a fragmentary sectional view through Fig. 5 approximately on line 4—4.

Fig. 5 is a transverse sectional view through the indicator shown in Fig. 4 the view being taken on line 5—5.

Fig. 6 is a diagram showing how the various parts operate and how the wires connect the automatic switch magnet and associate parts.

In using tanks for supplying different purposes and particularly in the use of gasolene tanks for automobiles, it has been found desirable to provide means for indicating the level of the gasolene. Various means heretofore have been provided, all of which however indicate at or near the tank the level of fluid therein. In the present invention an indicating means has been provided for indicating exteriorly of the tank but adjacent thereto the amount of gasolene still in the tank and means connected therewith arranged adjacent the seat of the driver also indicating the amount of gasolene in the tank. These means are arranged so that the pointer at the tank will always indicate automatically the amount of gasolene in the tank while the indicator near the seat of the driver will only indicate the quantity of gasolene in the tank when a switch has been closed.

In the drawing 1 indicates a tank of any desired kind provided with a bracket 2 extending into the tank and carrying at its lower end a beveled gear 3 to which the float arm 4 is rigidly secured, said float arm carrying a float 5 whereby the beveled gear 3 may move back and forth as the level of the gasolene varies. A beveled pinion 6 continually meshes with the gear 3, said pinion being secured to shaft 7 whereby the rotary motion will be communicated to shaft 7 as the float moves up and down. Shaft 7 is connected with an automatic indicator 8, which, through means hereinafter fully described, will cause the pointer of the indicator or signal member 9 to indicate on the dial 10 the same facts as presented by the indicator 8. The indicator 8 is shown in Figs. 2 and 3 and consists in an outer casing 11 which is bolted or otherwise rigidly secured to the tank 1 in such a manner that the center of the casing will be substantially in line with the shaft 7. Casing 11 is provided with a top cover 12 which is open at 13 so as to disclose the indications or numerals 14 (fig. 6). The opening 13 may, if desired, be covered with a transparent member, or the entire cap 12 may be a transparent member, in which case opening 13 would be eliminated. A pointer 15 is provided, said pointer passing over the dial formed by members 14. This pointer is rigidly secured to shaft 7 in any suitable manner so as to move therewith. The dial 14 is graduated so as to indicate in gallons or in any other measure the contents of the tank 1. An arm 16 is also rigidly secured to shaft 7, said arm being bifurcated at the outer end so as to support the spaced pivotal pins 17 and 18, which pins carry the bell crank levers 19 and 20, which levers are normally held in a given position by spring 21, which spring causes the contact rollers 22 and 23 to press against the shell 24 and contacts carried thereby, said shell being formed of insulating material, as for instance rubber. This shell 24 carries a single return contact strip 25 and a number of spaced contact strips 26, 27, 28, 29 and 30. The rollers 22 and 23 are arranged in pairs and are made of metal as well as their mounts so that when either pair of rollers is engaging the return strip 25 and one of the other contacts the circuit will be closed at this point. As shown in the diagram in Fig. 6 an independent wire is connected to each of the contacts, wire 31 being known as a common return, being connected to a battery or other source of current 32. Wire 33 extends from battery 32 to the magnets 34 there being a switch 35 interposed in wire 33, said switch being in the form of a push button as shown in Fig. 5, so that the operator of the automobile may at any time reach over and push the button and see by the swinging of the pointer 36 just how much gasolene there is in the tank.

In Fig. 4 the parts are shown in their neutral or idle position while in Fig. 6 the switch 35 is closed and the needle 36 is swung to its operative position and indicates that there is three gallons in the tank in a similar manner to the way the pointer 15 adjacent the tank indicates the fact that there is three gallons in the tank.

As heretofore described the end of the arm 16 is bifurcated so as to hold the pairs of rollers 22 and 23 spaced apart whereby when the pointer 15 is at an odd number the bifurcated end will straddle two of the segmental contacts so that two of the magnets 37 will be energized. As there are two magnets rigidly connected with the pointer 36 the poles of the magnets will come opposite the poles of two of the magnets 37. In case the rollers 22 and 23 are both engaging the same segment, as for instance segment 27, only one magnet 37 will be energized whereupon the poles of the magnets 34 will move to a position an equal distance over the dial of the particular magnet 37 energized as shown in Fig. 4. In Fig. 4 it will be seen that the poles of the magnets 34 are straddling in a certain sense the pole of the first magnet 37. If the central magnet 37 was energized the magnets 34 would move around until the poles thereof would straddle the poles of the central magnet and would thereby indicate the fact that there were four gallons in the tank. Preferably two magnets 34 are provided which are rigidly secured to the pointer 36 or to the shaft 38 as preferred, the magnets being preferably secured to the shaft as shown in Fig. 5 so as to be beneath the face plate 39, whereas the pointer 36 is above the face plate 39 in order to properly pass over the dial 40. If desired, instead of having two magnets 34 a single magnet could be used having spaced pole extensions for securing the results just described. If desired, the switch 35 could be held closed continually so as to cause the needle 36 to move gradually across the face of dial 40 and continually indicate the quantity of gasolene in tank 1, or switch 35 could normally remain open and cause the pointer 36 to indicate only when the information is desired. It will be noted that the arm 16, contact wheels 22 and 23 are arranged in an insulated housing or casing 24 whereby any sparking between the contacts would not affect the gasolene, though by providing a continuous contact by one of the sets of rollers sparking is absolutely prevented.

What I claim is:

1. A controller for the circuits of tank signals comprising a casing, a shaft extending into said casing, a switch associated with said shaft, said switch including a continuous contact member, an interrupted contact member formed of a plurality of insulated segments, both of said members being in said casing, and a pair of spaced connecting rollers for connecting said segments with said continuous contact, said spaced rollers being arranged to connect adjacent segments when passing from one segment to the other so as to not interrupt the flow of current.

2. A controller for the circuits of tank signals comprising a shaft, a casing surrounding the end of said shaft, a pointer arranged on said shaft, a dial for said pointer, a supporting arm rigidly secured to said shaft, and movable therewith, said arm having a bifurcated end, a pair of L-shaped levers pivotally mounted on each leg of the bifurcated end of said arm, a retractile spring connecting one end of said L-shaped levers, a pair of rollers mounted on the opposite end of each of said levers, the rollers of each pair being electrically connected, an annular continuous contact member adapted to continually contact with one roller of each pair, and an annular segmental contact member adapted to contact with the other rollers of each pair.

ERNEST E. PIERCE.